March 12, 1957  F. D. RALSTON ET AL  2,784,519
LURE ATTACHING MEANS FOR FISHING LEADERS
Filed April 8, 1955  2 Sheets-Sheet 1
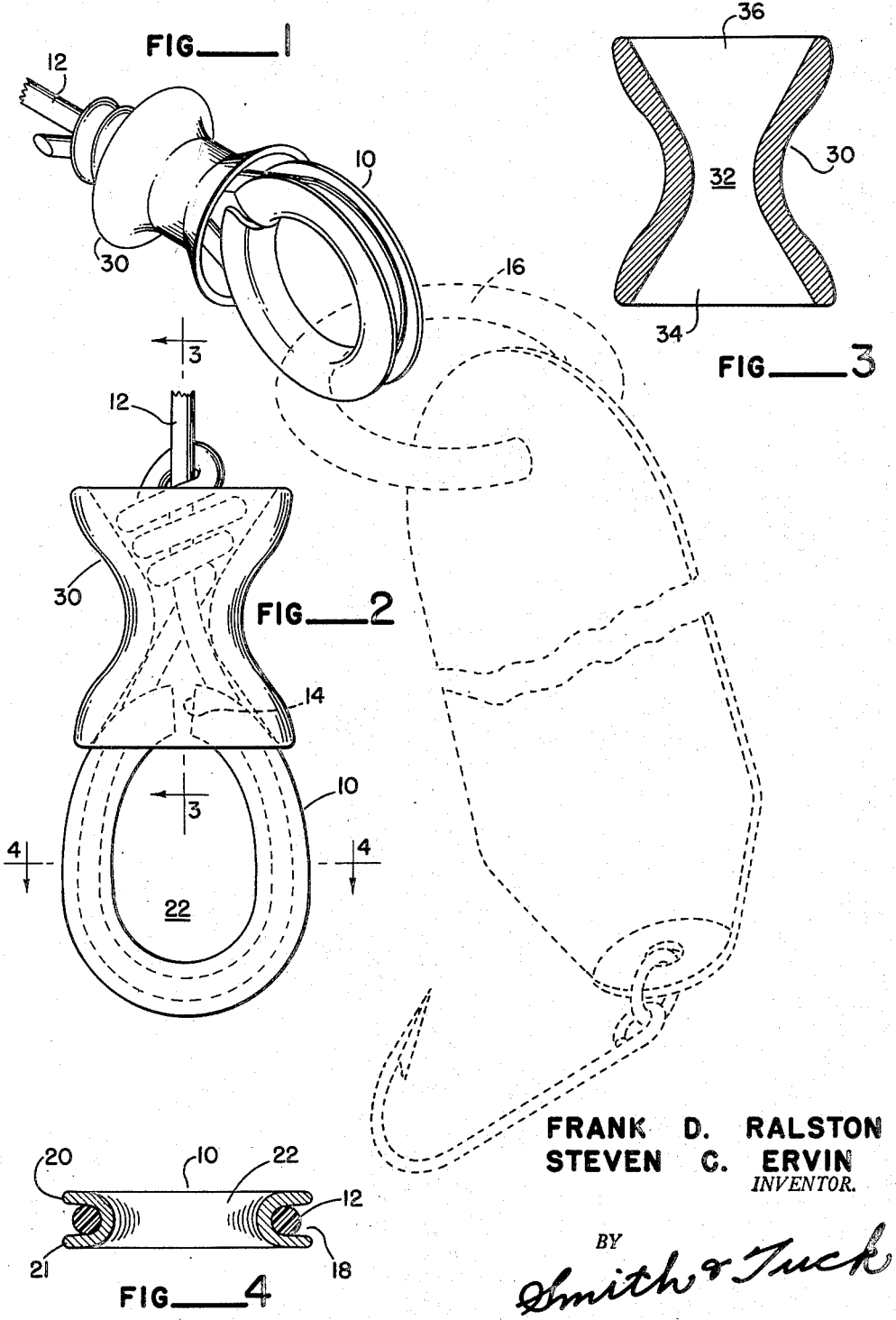
FRANK D. RALSTON
STEVEN C. ERVIN
INVENTOR.
BY
Smith & Tuck

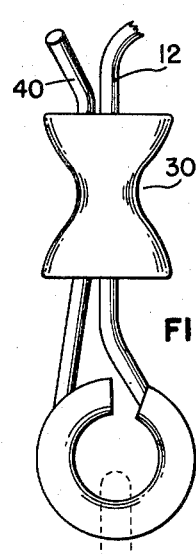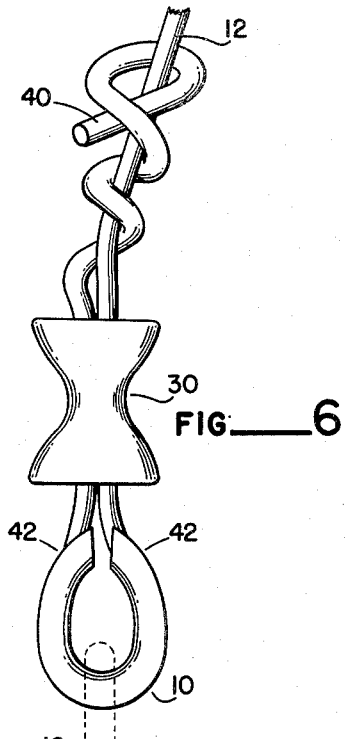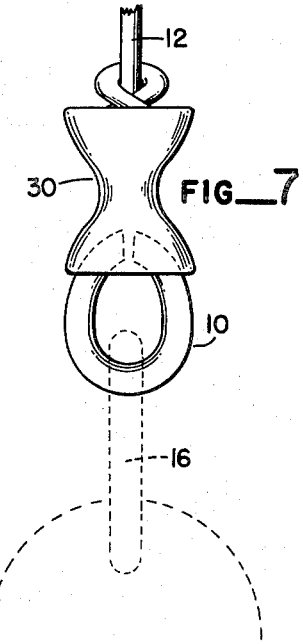

United States Patent Office 2,784,519
Patented Mar. 12, 1957

2,784,519
LURE ATTACHING MEANS FOR FISHING LEADERS

Frank D. Ralston and Steven C. Ervin, Kent, Wash.

Application April 8, 1955, Serial No. 500,070

6 Claims. (Cl. 43—44.98)

This present invention relates to the general art of fishing equipment, and, more particularly, to a means for attaching a fishing lure to the end of a fishing leader. In its preferred form this device consists essentially of two parts, one a small, distortable, split thimble, and a double conical seizing ferrule for use therewith. The two parts are associated together so they coact to provide the minimum strain on the fishing leader and, especially in the case of nylon or similar monofilament lines, the end of the line is seized within the conical ferrule so that no knot is required in the nylon line.

The principal object of this present invention, therefore, is to provide means for securing a lure to the end of a fishing leader in a manner which can be achieved easily in inclement weather or in diminished light, as twilight, without the necessity of actually tying a knot.

A further object of this invention is to provide a means for securing lures to the ends of fishing leaders in which special provision is made to insure against the prestressing of the leader material and to avoid the sharp bends which are so necessary in any secure knot tied in this type of leader material.

A further object of this invention is to provide means which will prevent the abrasion of leader stock while it is under use, tension or stress to the end that there will be no weakness in the leader such as is centered in the conventional leader knot.

Further objects, advantages and capabilities will be apparent from the description and disclosure in the drawings, or may be comprehended or are inherent in the device.

In the drawings:

Figure 1 is a perspective view of our leader terminal securing means with the parts shown as slightly separated in order to better illustrate the construction;

Figure 2 is a side elevation of Figure 1, in part, but showing the parts in their working position;

Figure 3 is a cross-sectional view through the longitudinal axis of our seizing ferrule, taken along the line 3—3 of Figure 2;

Figure 4 is a cross-sectional view taken along the line 4—4 of Figure 2 through our split thimble and illustrating the relationship between the depth of the groove in the same and the diameter of the leader material with which it is used;

Figures 5, 6 and 7 are views showing the successive steps in making a terminal connection using our present equipment.

Referring more particularly to the disclosure in the drawings, the numeral 10 designates, generally, our split thimble. This may be made of various types of material; however, because of its relatively small size, it should be made of a non-ferrous metal or one of the better plastics, such as nylon or Teflon. Throughout the various drawings the parts have been very appreciably enlarged for clarity and understanding, but for reference it is to be noted that the undistorted diameter of thimble 10 is normally less than ¼ inch, which, of course, is quite small, but not disproportionately small when it is remembered that a 30 pound test nylon leader 12 normally has a diameter of .028 inches.

As a matter of manufacturing expediency, the split thimbles are normally made from tubing or the like and are actually round in peripheral shape at the time of manufacturing them. A substantial cut is made in the ferrule, as at 14, so that the outer points of the cut can be started over the ring, as 16, which forms the part of most any lure or bait harness. After the thimble has been passed over the ring, it is then preferably grasped with a pair of split-joint pliers or other device so that pressure is applied above the horizontal diameter, as viewed in Figure 2, and sufficient pressure is applied to distort the thimble so that it is somewhat egg-shaped. Attention is particularly invited to the sectional view shown in Figure 4 where it is to be noted that the leader receiving groove 18 is considerably deeper than the diameter of the leader stock 12. In this way the outstanding edges of the groove, as 20 and 21, are beyond the outer margin of the leader and thus will adequately protect it at all times from any abrasion. It is very desirable to provide means to protect the leader from abrasion as it is most subject to damage when it is under its normal working strength, and that, of course, is the time when through the action of the fish or fishing conditions the thimble may be thrown forcibly against the lure or the side of the boat, or may contact the bottom where fishing of that type is being done. To reemphasize the exaggerated scale of the drawings, it is to be remembered that the diameter of bore 22 as used throughout this application is preferably of the order of .145 inch.

Adapted to coact with thimble 10 is the seizing ferrule 30. The ferrule is provided with a bore composed of a neck portion 32 and two conical portions 34 and 36. Reference is made to Figure 3 in which it will be noted that the throat portion 32 is joined to the conical portions 34 and 36 by smooth, easy curves. This is a very desirable feature of this design in that there are no sharp corners which will produce sharp bends in the leader stock 12. The ferrules, which again are quite small, may be made of non-ferrous or at least stainless metal, suitable plastics or the dense fibers. The ferrules as well as the thimbles, of course, may be made in various sizes, but basically they must be relatively small, and in order to preserve a sense of proportion, attention is invited to the fact that for use with the 30 pound test nylon monofilament having a diameter of .028 inch the overall length of the ferrule normally will work out to be about ³⁄₁₆ inch. The actual diameter of the throat 32 should normally be approximately twice the diameter of the leader stock with which it is to be used. In this instance, this would figure out to be .056 inch. The mouth of the conical portions 32 and 36 which, by the way, should be the same so that they will be reversible and the fisherman will not have to determine which end to use, should be flared out to be approximately twice the diameter of the throat bore 32. For the assumptions given, the interior diameter becomes .112 inch. The wall thickness of the metal ferrule can be as thin as ¹⁄₃₂ inch in this size, and for the plastic material should be somewhat increased so that the strength will be equivalent to a metal ferrule of the dimensions indicated.

The sequence of operations for the installation of our leader terminal is probably sufficiently illustrated in Figures 5, 6 and 7. In Figure 5 the end of the leader, as 40, is passed down through the bore of the ferrule and around the split thimble. Next, it is passed back up through the ferrule, and this condition is illustrated in Figure 5. A sufficient end length is pulled through so that end 40 can be passed around the main line of the leader, as 12, approximately three turns, and then the extreme end is tucked under the last turn, as illustrated in Figure 6. The next operation is to distort the split thimble, after the showing of Figure 6. This is accomplished, as previously noted, by means of a special tool or can be achieved by the usual slip-joint pliers. The final operation is to pull the turns of line 12 snug and tight, at the same time pressing down upon the end 40 and the turns of the leader around portion 12. This will achieve the desired end of seating the points 42 of the egg-shaped thimble into the lowermost conical recess of ferrule 30. At the same time the end of the leader 40 and the turns that have been passed around the main line portion 12 are drawn down into the upper of the conical bores, as 36, so that the final positioning of the parts is as in Figure 7, with the end 40 being well secured within the seizing ferrule and with the thimble partially compressed and firmly seated in the lower conical surface, as 34. This makes a secure fastening for the leader end without any sharp bends in it and, further, that portion of the leader which passes around the thimble is adequately protected by the deep groove 18.

It is believed that it will be clearly apparent from the above description and the disclosure in the drawings that the invention comprehends a novel construction of a lure attaching means for fishing leaders.

Having thus disclosed the invention, we claim:

1. Means for attaching a leader to a connecting ring of a lure or the like, comprising: a split thimble of normally rigid but distortable material formed with an outwardly facing U-shaped contour forming a peripheral groove and said leader passing around said thimble within the peripheral groove, the leader being of less diameter than the depth of the groove whereby the leader is shielded therein and said thimble having an egg shape with the smaller end being at the split of the thimble; and a seizing ferrule having a single bore with a medial neck of a size comparable to double the diameter of said leader and two flaring conical end portions of said bore of the same size joining said neck, and fairing into the neck in a curve said leader leading from a standing part through said ferrule and forming the bight around said thimble and having its running end extending led back through said ferrule and wound in a coil about the standing part of the leader and having a hitch therewith and the coiled and hitched portion being drawn into the adjacent conical portion of the ferrule and with the split portion of the thimble drawn within the other conical portion of said ferrule securing the assembly in place.

2. Means for attaching a leader of monofilament plastic material such as nylon to the connecting ring of a lure or the like, comprising: a split thimble for receiving said ring and having a peripheral groove and a seizing ferrule with a single bore which is necked medially in its bore and flared at each end beyond the neck and joining the neck in generous curves and one flared portion receiving the split portion of the thimble, one end portion of said leader having a running part extending from a standing part and extending from the end of the ferrule opposite said thimble through said neck and around said thimble in said peripheral groove and the running end of the leader extending back through said ferrule and forming a coil and terminating in a hitch with the standing part on the opposite side of the neck from the thimble and the coiled and hitched portion being drawn into the adjacent flaring end bore of the ferrule and the neck of the ferrule being of such small size as to prevent the hitch being drawn therethrough, and said peripheral groove having a greater depth than the diameter of said leader whereby the bite of the leader therearound is shielded within said peripheral groove.

3. Means for forming a rigid, secured loop in a line, comprising: an egg shaped thimble having a peripheral groove and a seizing ferrule with a single bore which is necked medially in its bore and flared at each end from the neck and one flared portion receiving the smaller end of the egg shaped thimble, one end portion of said line having a running part extending from a standing part and extending from the end of the ferrule opposite said thimble through said neck and around said thimble in said peripheral groove and the running end of the line extending back through said ferrule and then forming a knot with the standing part on the opposite side of the neck from the thimble and the knotted portion being drawn into the adjacent flaring end bore of the ferrule and the neck of the ferrule being of such small size as to prevent the knot being drawn therethrough.

4. Means for forming a rigid secured loop in a line, comprising: a thimble having a peripheral groove and said line extending around said thimble within the peripheral groove of the thimble; and a seizing ferrule having a single bore with a medial neck and two flaring conical end portions of said bore joining said neck, said line extending from a standing part through said ferrule and forming the bight around said thimble and having its running end extending back through said ferrule and making a knot with said standing part and the knotted portion being drawn into the adjacent conical portion of the ferrule and a portion of the thimble being drawn within the other conical portion of said ferrule securing the assembly in place, and said neck being of such small size as to prevent said knotted portion being drawn therethrough.

5. Means for attaching a leader to the ring of a lure or the like, comprising: a thimble having a peripheral groove and a seizing ferrule having a bore flaring at each end and necked medially and the thimble having a portion of a size which can be drawn into one of said flaring ends of said ferrule, and one end portion of leader extending through said ferrule toward said thimble and therearound in said peripheral groove and back through said thimble and secured with a knot drawn into the flaring end of the ferrule on the opposite side of the neck from said thimble.

6. Means for forming a shielded and secured loop in a line, comprising: an annular thimble having a peripheral groove and an annular seizing ferrule having a single bore medially necked and flaring in its end portions from the medial neck and a portion of said thimble abutting said ferrule bore and partially disposed in the adjacent flared end portion, whereby said shielded and secured loop may be formed in an end portion of said line by threading the line through said ferrule from the opposite end from said thimble and thence around said thimble in said peripheral groove and back through said ferrule and with the running part of the line forming a knot with the standing part which is drawn into the flaring end portion of said ferrule opposite said thimble.

References Cited in the file of this patent

UNITED STATES PATENTS

| | | |
|---|---|---|
| 1,730,333 | Pflueger | Oct. 1, 1929 |
| 1,836,744 | Bankwitz | Dec. 15, 1931 |
| 1,856,043 | Pflueger | Apr. 26, 1932 |
| 1,859,143 | Howe | May 17, 1932 |
| 1,867,555 | Hildebrandt | July 19, 1932 |
| 2,056,506 | Dopp | Oct. 6, 1936 |
| 2,060,499 | Heidrich | Nov. 10, 1936 |
| 2,155,536 | Fauria | Apr. 25, 1939 |